United States Patent
Sano

(10) Patent No.: US 10,844,799 B2
(45) Date of Patent: Nov. 24, 2020

(54) PLANT CONTROL SYSTEM

(71) Applicant: TOYOTA JIDOSHA KABUSHIKI KAISHA, Aichi-ken (JP)

(72) Inventor: Takeshi Sano, Hadano (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/352,828

(22) Filed: Mar. 14, 2019

(65) Prior Publication Data
US 2019/0285015 A1    Sep. 19, 2019

(30) Foreign Application Priority Data
Mar. 15, 2018    (JP) .................................. 2018-047990

(51) Int. Cl.
| | |
|---|---|
| *F02D 41/04* | (2006.01) |
| *G06F 17/11* | (2006.01) |
| *G05B 13/04* | (2006.01) |
| *F02D 41/14* | (2006.01) |

(52) U.S. Cl.
CPC ......... *F02D 41/04* (2013.01); *F02D 41/1401* (2013.01); *F02D 41/1406* (2013.01); *G05B 13/048* (2013.01); *G06F 17/11* (2013.01); *F02D 41/1487* (2013.01); *F02D 2041/1412* (2013.01); *G05B 13/041* (2013.01)

(58) Field of Classification Search
CPC .. F02D 41/04; F02D 41/1406; F02D 41/1401; F02D 2041/1412; F02D 41/1487; F02D 41/1488; F02D 41/1486; F02D 41/021; G05B 13/048; G05B 13/041; G05B 5/01; G05B 13/04; G06F 17/11
See application file for complete search history.

(56) References Cited

U.S. PATENT DOCUMENTS

| | | | | |
|---|---|---|---|---|
| 4,054,780 A | * | 10/1977 | Bartley ................ | G05B 13/048 700/30 |
| 4,694,390 A | * | 9/1987 | Lee .................... | G05B 23/0283 700/45 |
| 4,725,969 A | * | 2/1988 | Onogi .................. | B60K 31/047 123/351 |

(Continued)

FOREIGN PATENT DOCUMENTS

| | | |
|---|---|---|
| JP | 2011202553 A | 10/2011 |
| JP | 201448715 A | 3/2014 |
| JP | 2017-101627 A | 6/2017 |

*Primary Examiner* — Joseph J Dallo
(74) *Attorney, Agent, or Firm* — Hauptman Ham, LLP

(57) ABSTRACT

A plant control system comprises a target value calculating part calculating a target value r of a control output x of a plant, a target value correcting part correcting the target value so as to calculate a corrected target value w, and a feedback controller determining a control input. The target value correcting part, if making the control output change to the target value, sets the corrected target value so that an amount of correction of the target value becomes equal to or less than a predetermined value, then changes the corrected target value so that the amount of correction of the target value becomes larger than the predetermined value, then changes the corrected target value so that the amount of correction of the target value becomes equal to or less than the predetermined value before the control output reaches the target value.

9 Claims, 8 Drawing Sheets

(56) References Cited

U.S. PATENT DOCUMENTS

| | | | | |
|---|---|---|---|---|
| 5,219,391 | A * | 6/1993 | Edelen | F16H 61/32 |
| | | | | 701/60 |
| 5,392,215 | A * | 2/1995 | Morita | B60K 31/047 |
| | | | | 701/94 |
| 5,909,370 | A * | 6/1999 | Lynch | G05B 5/01 |
| | | | | 700/28 |
| 6,199,002 | B1 * | 3/2001 | Otaki | G05B 5/01 |
| | | | | 700/45 |
| 6,208,497 | B1 * | 3/2001 | Seale | H02P 25/032 |
| | | | | 361/160 |
| 6,684,920 | B2 * | 2/2004 | Seitz | B67D 1/0085 |
| | | | | 141/198 |
| 2001/0043450 | A1 * | 11/2001 | Seale | F01L 9/04 |
| | | | | 361/160 |
| 2005/0103312 | A1 * | 5/2005 | Uchiyama | F02M 63/0225 |
| | | | | 123/457 |
| 2015/0322871 | A1 | 11/2015 | Nakada | |
| 2015/0356413 | A1 | 12/2015 | Shimada | |
| 2018/0067461 | A1 | 3/2018 | Namie | |

\* cited by examiner

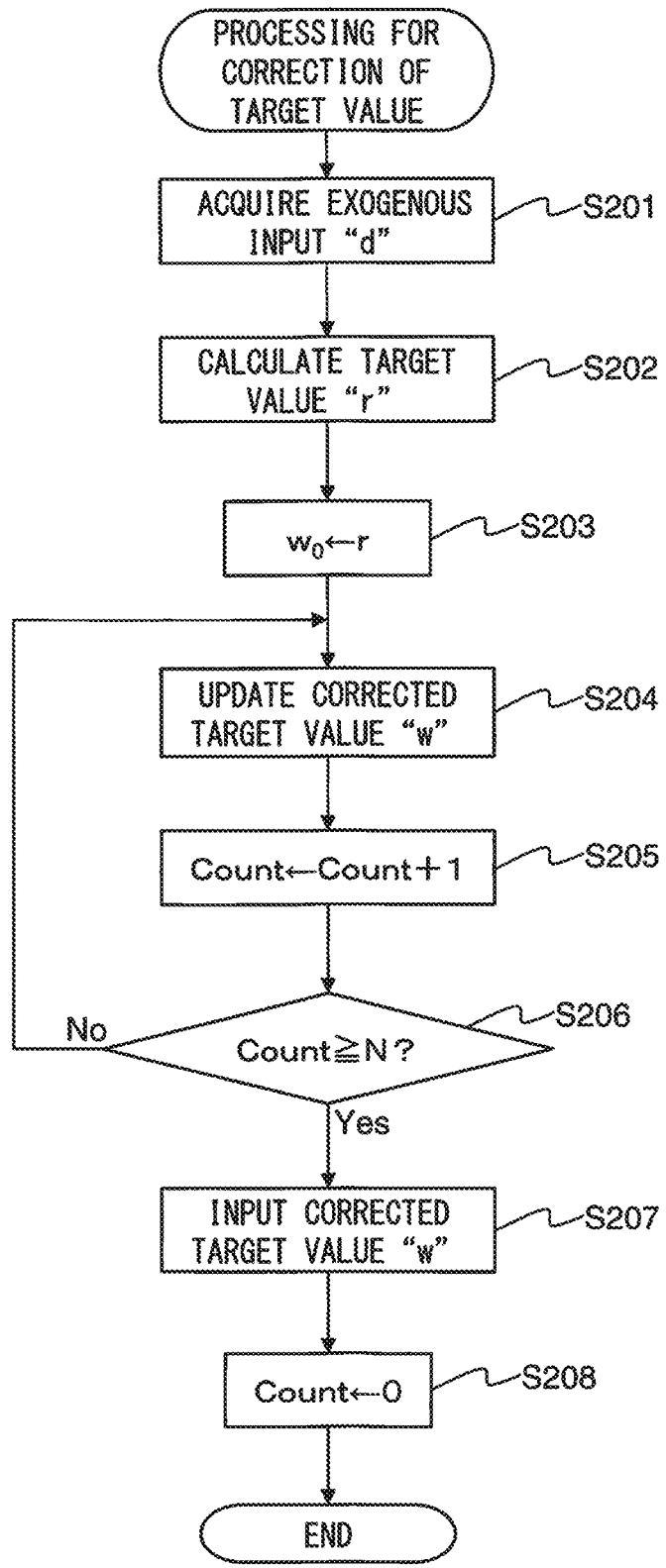

PLANT CONTROL SYSTEM

RELATED APPLICATIONS

The present application claims priority of Japanese Application Number 2018-047990, filed on Mar. 15, 2018, the disclosure of which is hereby incorporated by reference herein in its entirety.

FIELD

The present invention relates to a plant control system.

BACKGROUND

In a plant which is a controlled object, feedback control is performed so that a control output approaches a target value. However, in actual control, due to hardware or control constraints, there are often constraints on the value of the control output. If designing a control system ignoring such constraints, the transitional response is liable to deteriorate and control is liable to become unstable.

As a technique for improving the satisfaction of constraints, a "reference governor" is known (for example, PTL 1). A reference governor considers the satisfaction of constraints and corrects a target value of the control output calculated based on predetermined parameters of the plant to calculate a corrected target value. Specifically, the reference governor performs a minimum value search of a predetermined object function to thereby calculate the corrected target value.

PTL 1 describes correcting target values of a supercharging pressure and EGR rate in a diesel engine by a reference governor. Specifically, the gradient method is used to update the corrected target values so that value of the object function becomes smaller and thereby the corrected target values are calculated.

The target function includes a term relating to the amount of correction of the target value and a term relating to the degree of satisfaction of the limiting conditions regarding the state quantities. The term relating to the degree of satisfaction of the limiting conditions become larger the lower the degree of satisfaction of the limiting conditions. When the term relating to the degree of satisfaction of the limiting conditions is large, the target value is corrected so that the value of the objective function becomes smaller. As a result, the degree of satisfaction of the limiting conditions is made large, and the overshoot of the control output is suppressed.

CITATION LIST

Patent Literature

[PTL 1] Japanese Unexamined Patent Publication No. 2017-101627

SUMMARY

Technical Problem

In this regard, if performing control to make the control output closer to the target value when the difference between the target value and the current value of the control output is large, compared to when the difference between the target value and the current value is small, the possibility of future predicted values of state quantities of the plant touching upon limiting conditions becomes higher. For this reason, if conducting a minimum value search of the target function when the difference between the target value and the current value is large, the amount of correction of the target value tends to become larger. However, if the amount of correction of the target value is made large when the difference between the target value and the current value is large, the speed by which the control output approaches the target value becomes slow and the response of the control output deteriorates.

Therefore, in view of the above technical problem, an object of the present invention is to suppress overshoot of the control output while suppressing deterioration of the response of the control output if making the control output of the plant approach the target value.

Solution to Problem

The summary of the present disclosure is as follows.

(1) A plant control system comprising: a target value calculating part configured to calculate a target value of a control output of a plant based on one or more of predetermined parameters of the plant; a target value correcting part configured to correct the target value in a direction suppressing overshoot of the control output so as to calculate a corrected target value; and a feedback controller configured to determine a control input of the plant so that the control output approaches the corrected target value, wherein the target value correcting part is configured to, if making the control output change to the target value, set the corrected target value so that an amount of correction of the target value becomes equal to or less than a predetermined value, then change the corrected target value so that the amount of correction of the target value becomes larger than the predetermined value, then change the corrected target value so that the amount of correction of the target value becomes equal to or less than the predetermined value before the control output reaches the target value.

(2) The plant control system described in above (1), wherein the target value correcting part is configured to, if making the control output change to the target value, set the corrected target value so that the amount of correction of the target value becomes equal to or less than the predetermined value when a difference of the target value and a current value of the control output is larger than a first reference value, change the corrected target value so that the amount of correction of the target value becomes greater than the predetermined value when the difference reaches the first reference value, and change the corrected target value so that the amount of correction of the target value becomes equal to or less than the predetermined value when the difference reaches a second reference value, and wherein the second reference value is smaller than the first reference value.

(3) The plant control system described in above (1), wherein the target value correcting part is configured to perform a minimum value search of a target function to thereby calculate the corrected target value, and the target function includes a term relating to an amount of correction of the target value and a term relating to a degree of satisfaction of limiting conditions regarding a state quantity of the plant and is configured so that when a difference of the target value and a current value of the control output is relatively large, compared to when the difference is relatively small, a degree of contribution of the term relating to the amount of correction of the target value to a value of the target function becomes larger.

(4) The plant control system described in above (3), wherein the term relating to the amount of correction of the target value is a value obtained by multiplying a component which becomes larger the larger the amount of correction of the target value by a component which becomes larger the larger the difference.

(5) The plant control system described in above (3), wherein the term relating to the degree of satisfaction of the limiting conditions is a value obtained by dividing a component which becomes larger the lower the degree of satisfaction of the limiting conditions by a component which becomes larger the larger the difference.

(6) The plant control system described in above (4) or (5), wherein the component which becomes larger the larger the difference is an "n" power of the difference and "n" is larger than zero.

(7) The plant control system described in above (6), wherein the plant is an internal combustion engine and "n" is a value of 4 to 6.

Advantageous Effects of Invention

According to the present invention, it is possible to suppress overshoot of the control output while suppressing deterioration of the response of the control output if making the control output of the plant approach the target value.

BRIEF DESCRIPTION OF DRAWINGS

FIG. 9 is a flow chart showing a control routine for processing for correction of a target value in a second embodiment.

DESCRIPTION OF EMBODIMENTS

Figure 1:
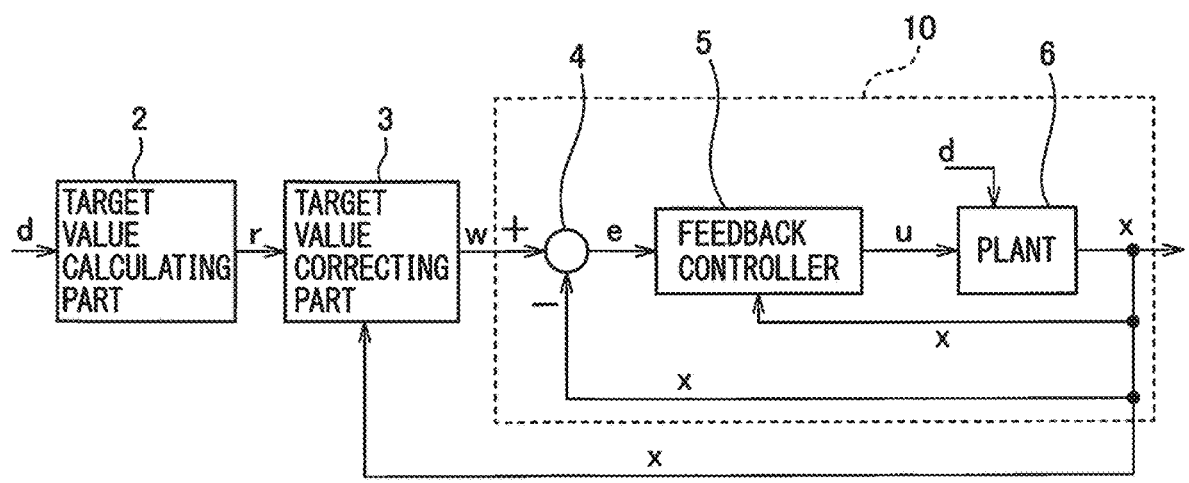
FIG. 1 is a view showing a target value tracking control structure of a plant control system according to a first embodiment.
Figure 2:
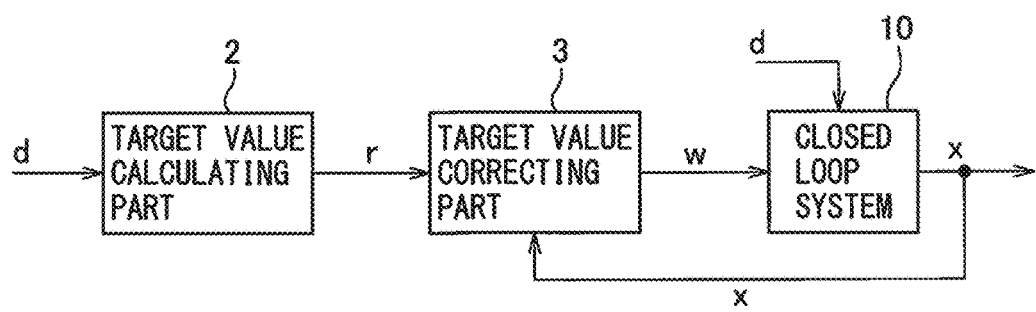
FIG. 2 shows a feedforward control structure obtained by equivalently modifying the target value tracking control structure of FIG. 1.

Below, referring to the drawings, embodiments of the present invention will be explained in detail. Note that, in the following explanation, similar components will be assigned the same reference signs.

First Embodiment

First, referring to FIG. 1 to FIG. 4, a first embodiment of the present invention will be explained.

<Configuration of Plant Control System>

FIG. 1 is a view showing a target value tracking control structure of a plant control system according to the first embodiment. The plant control system is provided with a target value calculating part 2, target value correcting part 3, comparator 4, and feedback controller 5. For example, a microprocessor such as an electronic control unit (ECU) functions as a plant control system.

The part surrounded by the broken line in FIG. 1 functions as a closed loop system 10 controlling the output of plant 6 which is a controlled object. If the closed loop system 10 has been designed, the target value tracking control structure of FIG. 1 is equivalently modified to obtain the feed forward control structure of FIG. 2.

The target value calculating part 2 calculates the target value "r" of the control output "x" of the plant 6 based on the exogenous input "d" and outputs the target value "r" to the target value correcting part 3. The target value calculating part 2 is, for example, configured as a target value map in which the relationship of the exogenous input "d" and the target value "r" is shown. The exogenous input "d" is a predetermined parameter of the plant 6.

If the target value "r" is input as is to the closed loop system 10, feedback control is performed so that the control output "x" approaches the target value "r". In this case, the control output "x" can be made to quickly approach the target value "r", but the amount of overshoot of the control output "x" becomes larger. For this reason, in this embodiment, the target value "r" is corrected by the target value correcting part 3. The target value correcting part 3 corrects the target value "r" in a direction suppressing overshoot of the control output "x" to calculate the corrected target value "w".

The comparator 4 subtracts the control output "x" from the corrected target value w to calculate the difference "e" (=w−x) and inputs the difference "e" to the feedback controller 5. The target value w is input by the target value correcting part 3 to the comparator 4, while the control output "x" is output from the plant 6 to which the control input "u" and exogenous input "d" are input. The control output "x" is detected by a sensor or other detector or estimated using a calculation formula etc.

The feedback controller 5 determines the control input "u" so that the control output "x" approaches the corrected target value w. That is, the feedback controller 5 determines the control input "u" so that the difference "e" approaches zero. In the feedback controller 5, PI control, PID control, or other known control is used. The feedback controller 5 inputs the control input "u" to the plant 6. Further, the control output "x" is input to the feedback controller 5 as a state feedback. Note that, the input of the control output "x" to the feedback controller 5 may be omitted. Further, the comparator 4 may be built into the feedback controller 5.

<Correction of Target Value>

As explained above, the target value correcting part 3 corrects the target value "r" in the direction suppressing overshoot of the control output "x" to calculate the corrected target value "w". Note that, the "direction suppressing overshoot of the control output 'x'" means the direction of making the corrected target value "w" decrease when making control output "x" increase toward the target value "r" and means the direction of making the corrected target value "w" increase when making the control output "x" decrease toward the target value "r".

If the amount of correction of the target value "r" is made large when the difference between the target value "r" and the current value of the control output "x" is large, the speed of the control output "x" approaching the target value "r" becomes slower and the response of the control output "x" deteriorates. Further, to suppress overshoot of the control output "x", it is effective to increase the amount of correction of the target value "r" when the control output "x" approaches the target value "r". Further, to make the control output "x" converge to the target value "r", it is necessary to make the amount of correction of the target value "r" smaller before the control output "x" reaches the target value "r".

For this reason, in the present embodiment, the target value correcting part 3 sets the corrected target value "w" so that the amount of correction of the target value "r" becomes equal to or less than a predetermined value when making the control output "x" change to the target value "r", then changes the corrected target value "w" so that the amount of correction of the target value "r" becomes larger than the predetermined value, then changes the corrected target value "w" so that the amount of correction of the target value "r" becomes equal to or less than the predetermined value before the control output "x" reaches the target value "r". Note that, the "amount of correction of the target value 'r'" is the difference between the target value "r" and the corrected target value "w".

Due to this, if the difference between the target value "r" and the current value of the control output "x" is relatively large, it is possible to make the speed of change of the control output "x" faster and possible to suppress deterioration of the response of the control output "x". Further, when the difference between the target value "r" and the current value of the control output "x" is relatively small, it is possible to slow the speed of change of the control output "x" and possible to suppress overshoot of the control output "x". Therefore, in the present embodiment, when making the control output "x" approach the target value "r", it is possible to suppress overshoot of the control output "x" while suppressing deterioration of response of the control output "x".

In the present embodiment, when the difference between the target value "r" and the current value of the control output "x" is larger than a first reference value, the target value correcting part 3 sets the corrected target value "w" so that the amount of correction of the target value "r" becomes equal to or less than a predetermined value, changes the corrected target value "w" so that the amount of correction of the target value "r" becomes larger than the above predetermined value when the difference between the target value "r" and the current value reaches the first reference value, and changes the corrected target value "w" so that the amount of correction of the target value "r" becomes equal to or less than the above predetermined value when the difference between the target value "r" and the current value reaches a second reference value. The second reference value is smaller than the first reference value.

For example, the target value correcting part 3 sets the corrected target value "w" to the target value "r" when the difference between the target value "r" and the current value is larger than the first reference value, makes the corrected target value "w" separate from the target value "r" when the difference between the target value "r" and the current value reaches the first reference value, and changes the corrected target value "w" to the target value "r" when the difference between the target value "r" and the current value reaches the second reference value.

<Explanation of Control Using Time Chart>

Figure 3:
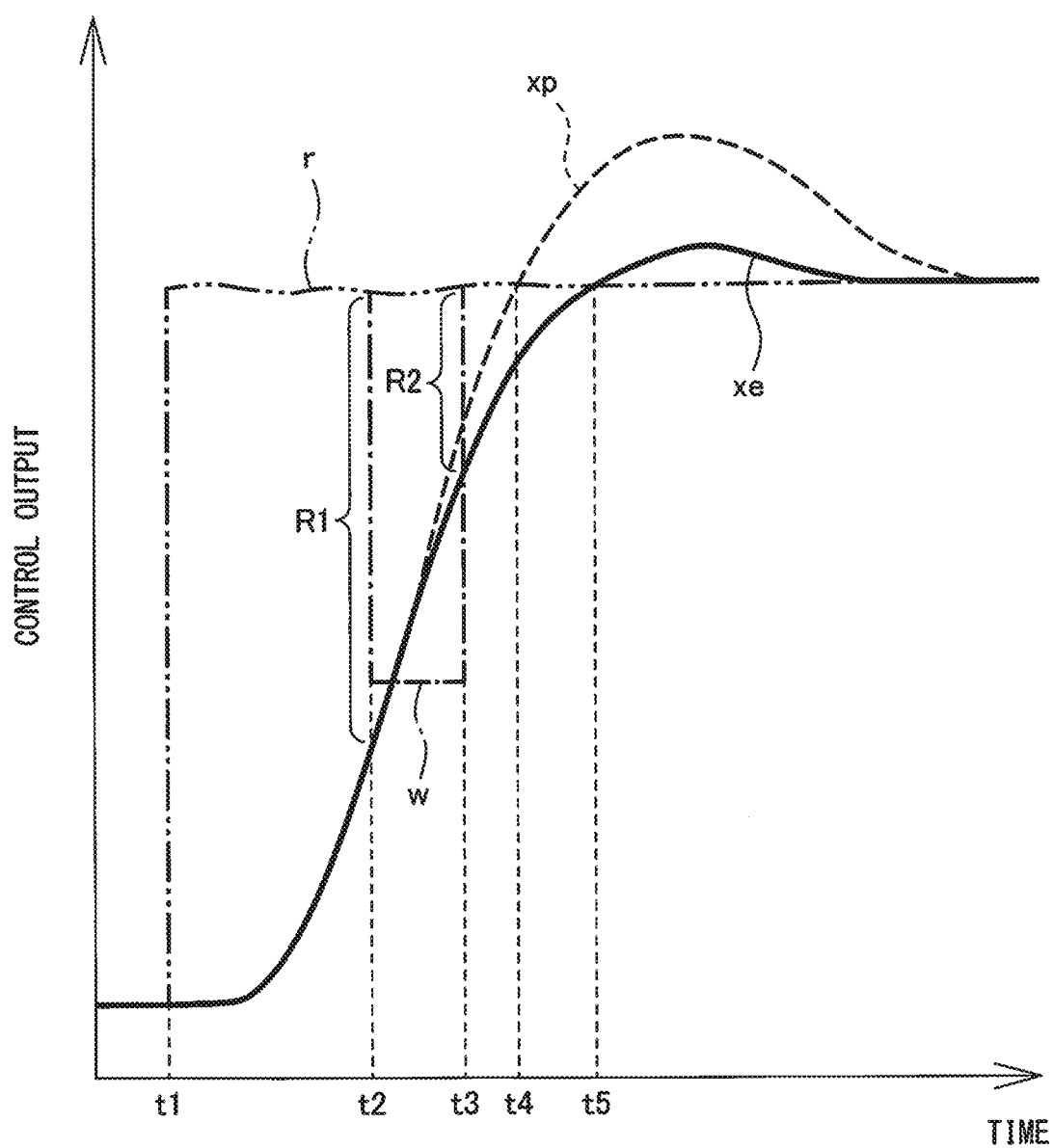
FIG. 3 is a time chart of a target value, corrected target value, and actual value of a control output in the case of making a control output change to the target value.

FIG. 3 is a time chart of the target value, the corrected target value, and the actual value of the control output in the case of making the control output change to the target value. FIG. 3 shows the target value "r" of the control output "x" by a two-dot chain line and shows the corrected target value "w" of the control output "x" by a one-dot chain line. Further, the actual value (current value) xe of the control output "x" when control of the present embodiment is performed is shown by the solid line, while the actual value (current value) xp of the control output "x" when control of the comparative example is performed is shown by the broken line.

In the example of FIG. 3, at the time t1, the state of the plant 6 changes and the target value "r" increases. The target value "r" is maintained at a substantially constant value after the time t1. In this example, control is performed to make the control output "x" increase toward the target value "r".

In the control of the comparative example, the target value "r" is not corrected. Therefore, the control input "u" is determined by the feedback controller 5 so that the control output "x" approaches the target value "r". As a result, after the time t1, the actual value xp gradually rises and at the time t4 reaches the target value "r". After the time t4, overshoot of the control output "x" occurs, then the actual value xp converges to the target value "r".

On the other hand, in the control of the present embodiment, the corrected target value "w" is calculated and the control input "u" is determined by the feedback controller 5 so that the control output "x" approaches the corrected target value "w". From the time t1 to the time t2, the corrected target value "w" is equal to the target value "r". That is, the target value "r" is not corrected.

At the time t2, the difference between the target value "r" and the actual value xe reaches the first reference value R1 and the corrected target value "w" is changed so that the amount of correction of the target value "r" becomes larger than a predetermined value. In this example, to suppress overshoot of the control output "x", the corrected target value "w" is made smaller in steps. The corrected target value "w" is maintained at the constant value from the time t2 to the time t3.

At the time t3, the difference between the target value "r" and the actual value xe reaches the second reference value and the corrected target value "w" is changed to the target value "r". In this example, to make the control output "x" converge to the target value "r", the corrected target value "w" is made larger in steps. After the time t3, the corrected target value "w" is maintained at the target value "r". That is, the target value "r" is not corrected.

After that, the actual value xe reaches the target value "r" at the time t5. After the time t5, overshoot of the control output "x" slightly occurs, then the actual value xe converges to the target value "r".

In the control of the present embodiment, by making the corrected target value "w" smaller at the time t2, it is possible to apply a brake to the rise of the control output "x". For this reason, compared to the control of the comparative example, it is possible to reduce the amount of overshoot of the control output "x". Further, the corrected target value "w" is set to the target value "r" before the time t2, so in the same way as the control of the comparative example, the control output "x" can be made to quickly approach the target value "r". Therefore, in the control of the present embodiment, it is possible to suppress overshoot of the control output "x" while suppressing deterioration of response of the control output "x".

<Processing for Correction of Target Value>

Figure 4:
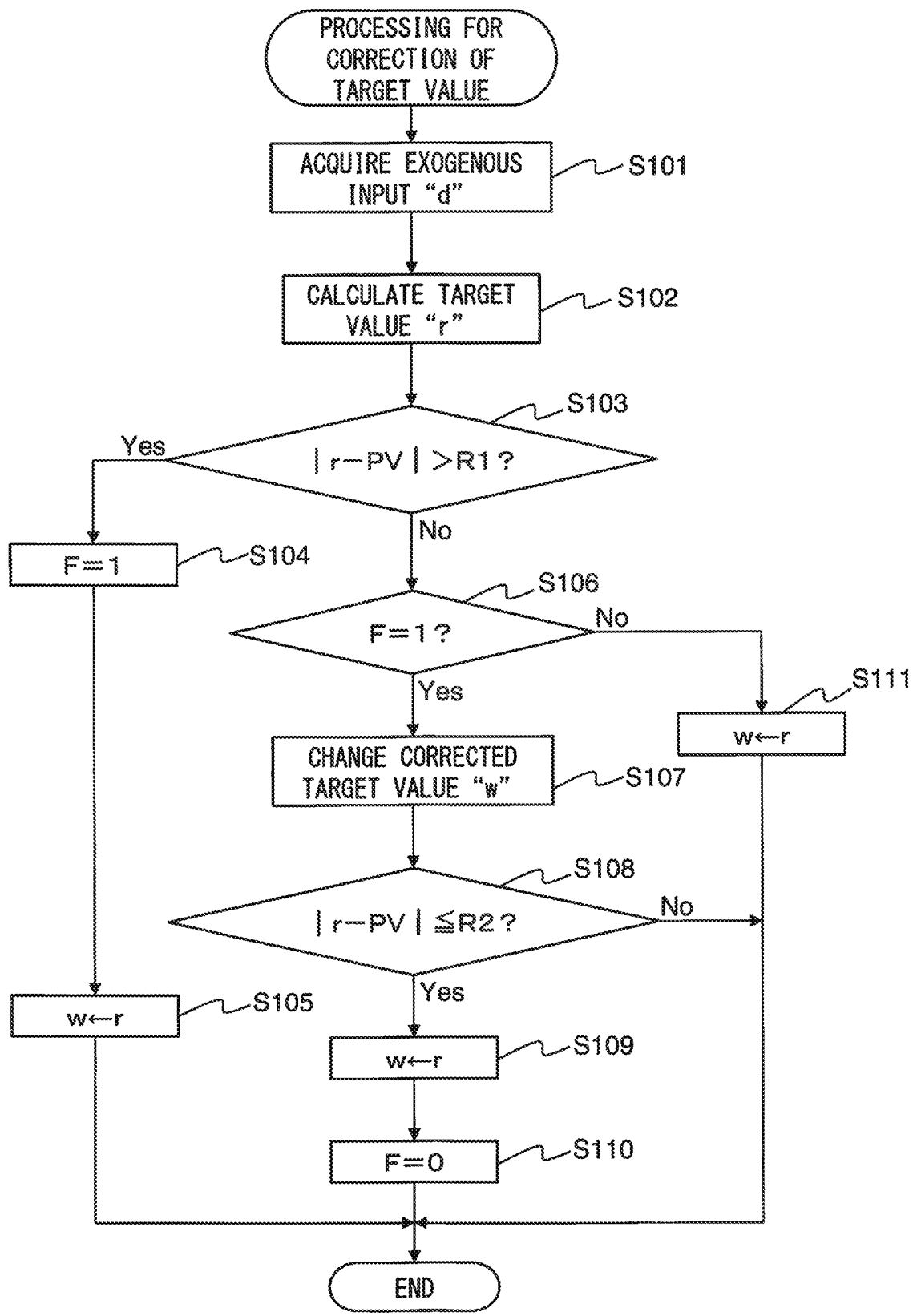
FIG. 4 is a flow chart showing a control routine for processing for correction of a target value in a first embodiment.

Below, referring to the flow chart of FIG. 4, the control for correcting the target value "r" to calculate the corrected target value "w" will be explained in detail. FIG. 4 is a flow chart showing a control routine of processing for correction of the target value in the first embodiment. The present control routine is repeatedly performed at predetermined intervals by the plant control system.

First, at step S101, the target value calculating part 2 acquires the exogenous input "d". Next, at step S102, the target value calculating part 2 calculates the target value "r" based on the exogenous input "d".

Next, at step S103, the target value correcting part 3 judges whether the absolute value of the value of the target value "r" minus the current value PV of the control output "x", that is, the difference between the target value "r" and the current value PV, is larger than the first reference value R1. The first reference value R1 is predetermined and a value larger than zero. If it is judged that the difference between the target value "r" and the current value PV is larger than the first reference value R1, the present control routine proceeds to step S104.

At step S104, the target value correcting part 3 sets the corrected target value changing flag to "1". Note that, the corrected target value changing flag F is reset to zero when the feedback control of the control output "x" has ended. Next, at step S105, the target value correcting part 3 sets the corrected target value "w" to the target value "r" so as to make the control output "x" quickly change to the target value "r". After step S105, the present control routine ends.

On the other hand, if at step S103 it is judged that the difference between the target value "r" and the current value PV is equal to or less than the first reference value R1, the present control routine proceeds to step S106. At step S106, the target value correcting part 3 judges whether the corrected target value changing flag F is "1". If it is judged that the corrected target value updating flag F is "1", the present control routine proceeds to step S107.

At step S107, the target value correcting part 3 corrects the corrected target value "w" so that the amount of correction of the target value "r" becomes larger than a predetermined value. The predetermined value is preset so as to suppress overshoot of the control output "x" and is a value larger than zero. The target value correcting part 3 makes the corrected target value "w" change in steps in a direction suppressing overshoot of the control output "x". Specifically, the target value correcting part 3 makes the corrected target value "w" smaller than the target value "r" if making the control output "x" increase toward the target value "r" and makes the corrected target value "w" larger than the target value "r" if making the control output "x" decrease toward the target value "r".

Next, at step S108, the target value correcting part 3 judges whether the difference between the target value "r" and the current value PV is equal to or less than a second reference value R2. The second reference value R2 is preset and is larger than zero and smaller than the first reference value R1. If it is judged that the difference between the target value "r" and the current value PV is larger than the second reference value R2, the present control routine ends. In this case, the corrected target value "w" is maintained at the value changed at step S107.

On the other hand, if it is judged that the difference between the target value "r" and the current value PV is equal to or less than the second reference value R2, the present control routine proceeds to step S109. At step S109, the target value correcting part 3 changes the corrected target value "w" to the target value "r" so as to make the control output "x" converge to the target value "r". The target value correcting part 3 makes the corrected target value "w" change to the target value "r" in steps. Next, at step S110, the target value correcting part 3 sets the corrected target value changing flag F to zero. After step S110, the present control routine ends.

Further, if at step S106 it is judged that the corrected target value changing flag F is zero, the present control routine proceeds to step S111. At step S111, the target value correcting part 3 sets the corrected target value "w" to the target value "r". After step S111, the present control routine ends.

Note that, at step S105, step S109, and step S111, so long as the corrected amount of the target value "r" is equal to or less than the predetermined value, the corrected target value "w" may be set to a value different from the target value "r". Further, the target value correcting part 3 may gradually change the corrected target value "w" to the changed value at step S107 and may gradually change the corrected target value "w" to the target value "r" at step S109.

Second Embodiment

The configuration and control of the plant control system in the second embodiment are basically similar to the plant control system in the first embodiment except for the points explained below. For this reason, below, the second embodiment of the present invention will be explained focusing on parts different from the first embodiment.

Figure 5:
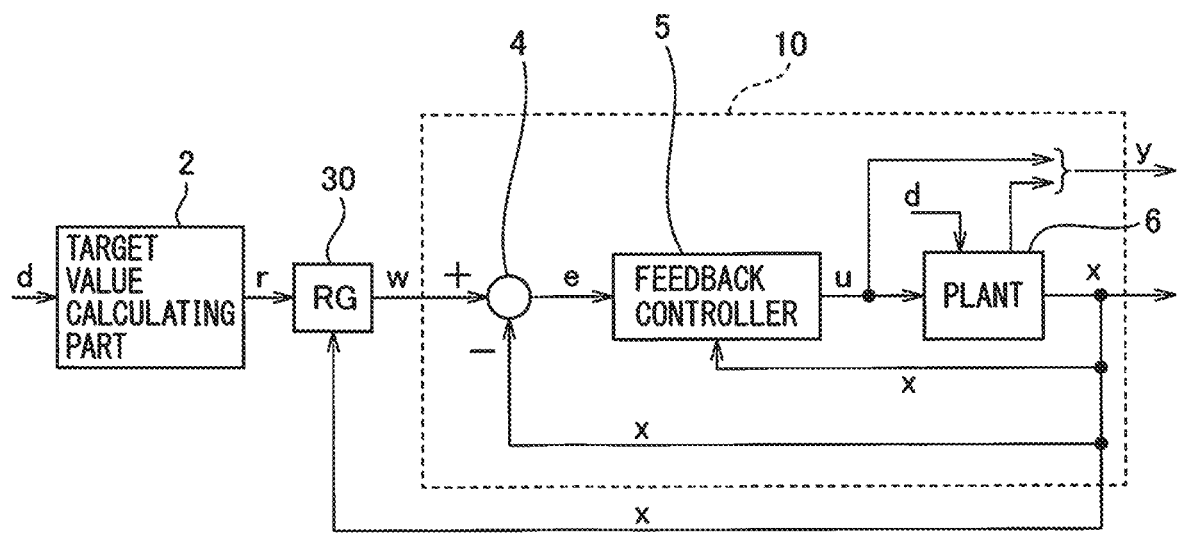
FIG. 5 is a view showing a target value tracking control structure of a plant control system according to a second embodiment.

FIG. 5 is a view showing a target value tracking control structure of a plant control system according to a second embodiment. In the second embodiment, the reference governor (RG) 30 functions as a target value correcting part correcting the target value "r" to calculate the corrected target value "w". In FIG. 5, "y" are state quantities of the plant 6 limited in value which can be taken.

As explained above, in the closed loop system 10, feedback control of the control output "x" is performed. However, in actual control, due to hardware or control constraints, there are constraints on the state quantities "y". For this reason, if the target value calculated without considering such constraints is input to the closed loop system 10, the state quantities "y" may conflict with the constraints, thus leading to deterioration of the transitional response and control instability.

For this reason, the reference governor 30 corrects the target value "r" to calculate the corrected target value "w" so that the degree of satisfaction of the limiting conditions regarding state quantities "y" becomes higher. Specifically, the reference governor 30 performs a minimum value search of the target function to thereby calculate the corrected target value "w". In the minimum value search, the reference governor 30 updates the corrected target value "w" a predetermined number of times so that the value of the target function becomes smaller to thereby calculate the final corrected target value "w" input to the closed loop system 10.

The target function includes a term relating to the amount of correction of the target value "r" and a term relating to the degree of satisfaction of the limiting conditions regarding the state quantities "y". When a difference between the target value "r" and the current value of the control output "x" is relatively large, compared to when the difference between the target value "r" and the current value is relatively small, it is necessary to make the amount of correction of the target value "r" larger so as to raise the degree of satisfaction of the limiting conditions.

However, if the amount of correction of the target value "r" is increased when the difference between the target value "r" and the current value is large, the speed of the control output "x" approaching the target value "r" becomes slower and the response of the control output "x" deteriorates. Further, to suppress overshoot of the control output "x", it is effective to increase the amount of correction of the target value "r" when the control output "x" approaches the target value "r".

For this reason, the target function is configured so that the amount of correction of the target value "r" becomes smaller when the difference between the target value "r" and the current value of the control output "x" is relatively large compared to when the difference between the target value "r" and the current value of the control output "x" is relatively small. Specifically, the target function is configured so that the degree of contribution of the term relating to the amount of correction of the target value to the value of the target function becomes larger when the difference between the target value "r" and the current value of the control output "x" is relatively large compared to when the difference between the target value "r" and the current value is relatively small.

By doing this, if the difference between the target value "r" and the current value of the control output "x" is relatively large, it is possible to increase the speed of change of the control output "x" and possible to suppress deterioration of the response of the control output "x". Further, when the difference between the target value "r" and the current value of the control output "x" is relatively small, it is possible to slow the speed of change of the control output "x" and possible to suppress overshoot of the control output "x". Therefore, in the second embodiment, if making the control output "x" approach the target value "r", it is possible to suppress overshoot of the control output "x" while suppressing deterioration of the response of the control output "x".

For example, the target function J(w) is defined by the following formula (1).

$$J(w) = (r-w)^2 (|r-PV|)^n + S_1^2 + S_2^2 + \ldots \quad (1)$$

where, PV is a current value of the control output "r" and "n" is a value larger than zero. The target function J(w) is configured as the sum of the term relating to the amount of correction of the target value "r" (formula (1), right side, first term) and the term relating to the degree of satisfaction of the limiting conditions regarding the state quantities "y" (formula (1), right side, second term on).

The term relating to the amount of correction of the target value "r" is the value of a component $((r-w)^2)$ which becomes larger the larger the amount of correction of the target value "r" multiplied with a component $((|r-PV|)^n)$ which becomes larger the larger the difference between the target value "r" and the current value of the control output "x". In this case, when the amount of correction of the target value "r" is a predetermined value, the term relating to the amount of correction of the target value "r" becomes larger the larger the difference between the target value "r" and the current value of the control output "x". For this reason, if the difference between the target value "r" and the current value of the control output "x" is relatively large, compared to if the difference between the target value "r" and the current value of the control output "x" is relatively small, the degree of contribution of the term relating to the amount of correction of the target value "r" to the value of the target function J(w) becomes larger.

In the above formula (1), the component which becomes larger the larger the amount of correction of the target value "r" is the difference between the target value "r" and the corrected target value "w", that is, the square of the amount of correction of the target value "r". However, this component may be a value obtained by multiplying the amount of correction of the target value "r" by a predetermined coefficient etc.

Further, in the above formula (1), the component which becomes larger the larger the difference between the target value "r" and the current value of the control output "x" is the n-th power of the difference between the target value "r" and the current value PV. However, this component may be a value obtained by multiplying the difference between the target value "r" and the current value PV with a predetermined coefficient.

The term relating to the degree of satisfaction of the limiting conditions includes a square of a first penalty function $S_1$, a square of a second penalty function $S_2$, etc. The number of penalty functions fluctuates depending on the number of limiting conditions. For example, if there are four limiting conditions, the term relating to the degree of satisfaction of the limiting conditions includes the square of the first penalty function $S_1$, the square of the second penalty function $S_2$, a square of a third penalty function $S_3$, and a square of a fourth penalty function $S_4$. The penalty functions become larger the lower the degree of satisfaction of the limiting conditions. Note that, the penalty functions may not be squared.

The first penalty function $S_1$ relates to the degree of satisfaction of the limiting condition for the control output "x" which is one of the state quantities "y". In the first penalty function $S_1$, the amount of overshoot of control output "x" not becoming larger than zero is defined as the limiting condition. When making the control output "x" increase toward the target value "r", the first penalty function $S_1$ is defined by the following formula (2):

[Mathematical 1]

$$S_1 = p_1 \sum_{k=1}^{Nh} \max\{x(k) - r, 0\} \quad (2)$$

where, x(k) is a future predicted value of the control output "x", while $p_1$ is a predetermined weighting factor. Further, "k" is a discrete time step, while Nh is the number of prediction steps (prediction horizon). The first penalty function $S_1$ is configured so that when the future predicted value x(k) of the control output "x" becomes larger than the target value "r", the difference between the future predicted value x(k) and the target value "r" of the control output "x" is added as a penalty to the target function J(w). For this reason, the first penalty function S becomes larger the larger the amount of overshoot of the future predicted value x(k) of the control output "x".

On the other hand, if the control output "x" is made to decrease toward the target value "r", the first penalty function $S_1$ is defined by the following formula (3):

[Mathematical 2]

$$S_1 = p_1 \sum_{k=1}^{Nh} \max\{r - x(k), 0\} \quad (3)$$

In this case, the first penalty function $S_1$ is configured so that if the future predicted value x(k) of the control output "x" becomes smaller than the target value "r", the difference between the future predicted value x(k) and the target value "r" of the control output "x" is added as a penalty to the target function J(w). For this reason, the first penalty function $S_1$ becomes larger the larger the amount of overshoot of the future predicted value x(k) of the control output "x".

The reference governor 30 calculates the future predicted value x(k) of the control output "x" using a model of the plant 6. The reference governor 30, for example, calculates the future predicted value x(k) of the control output "x" by the following formula (4):

$$x(k+1)=f_1(x(k),w,d) \quad (4)$$

Here, $f_1$ is a model function used for calculating the future predicted value x(k) of the control output "x". First, using the control output "x" at the time of calculation, that is, x(0), the predicted value x(1) of the control output "x" one step ahead from the time of calculation is calculated. The control output x(0) at the time of calculation is detected by a detector as a sensor or estimated using a calculation formula etc. After that, the future predicted value x(k) of the control output "x" is successively calculated up to the predicted value x(Nh) of the control output "x" of Nh steps ahead from the time of calculation. A total of Nh number of future predicted values of the control output "x" are calculated. Note that, the value obtained by multiplying the time corresponding to one step by the number Nh of prediction steps becomes the prediction time period.

The second penalty function $S_2$ relates to the degree of satisfaction of the limiting condition relating to a predetermined state quantity $y_2$. The state quantity $y_2$ is, for example, the pressure, rotation speed, etc. In the second penalty function $S_2$, for example, the state quantity $y_2$ not becoming larger than the upper limit value is defined as the limiting condition. In this case, the second penalty function $S_2$ is defined by the following formula (5).

[Mathematical 3]

$$S_2 = p_2 \sum_{k=1}^{Nh} \max\{y_2(k) - y_{2up}, 0\} \quad (5)$$

where, $y_2(k)$ is the future predicted value of the state quantity $y_2$, $y_{2up}$ is a predetermined upper limit value of the state quantity $y_2$, and $p_2$ is a predetermined weighting factor. Further, "k" is a discrete time step while Nh is a number of prediction steps (prediction horizon). The second penalty function $S_2$ is configured so that if the future predicted value $y_2(k)$ of the state quantity $y_2$ becomes larger than the upper limit value $y_{2up}$, the difference of the future predicted value $y_2(k)$ and the upper limit value $y_{2up}$ of the state quantity $y_2$ is added as a penalty to the target function J(w). For this reason, the second penalty function $S_1$ becomes larger the larger the amount by which the future predicted value $y_2(k)$ of the state quantity $y_2$ exceeds the upper limit value $y_{2up}$.

Note that, in the second penalty function $S_2$, if the state quantity $y_2$ not becoming smaller than the lower limit value is defined as the limiting condition, the second penalty function $S_2$ is defined by the following formula (6):

[Mathematical 4]

$$S_2 = p_2 \sum_{k=1}^{Nh} \max\{y_{2low} - y_2(k), 0\} \quad (6)$$

where, $y_{2low}$ is a predetermined lower limit value of the state quantity $y_2$.

In this case, the second penalty function $S_2$ is configured so that if the future predicted value $y_2(k)$ of the state quantity $y_2$ becomes smaller than the lower limit value $y_{2low}$, the difference of the future predicted value $y_2(k)$ and the lower limit value $y_{2low}$ of the state quantity $y_2$ is added as a penalty to the target function J(w). For this reason, the second penalty function $S_1$ becomes larger the larger the amount by which the future predicted value $y_2(k)$ of the state quantity $y_2$ falls below the lower limit value $y_{2low}$.

Note that, the future predicted value $y_2(k)$ of the state quantity $y_2$ is calculated in the same way as the future predicted value x(k) of the control output "x" using a model of the plant 6. Further, the future predicted value of each state quantity may be calculated by the other method as mechanical learning using a neural network.

Figure 6:
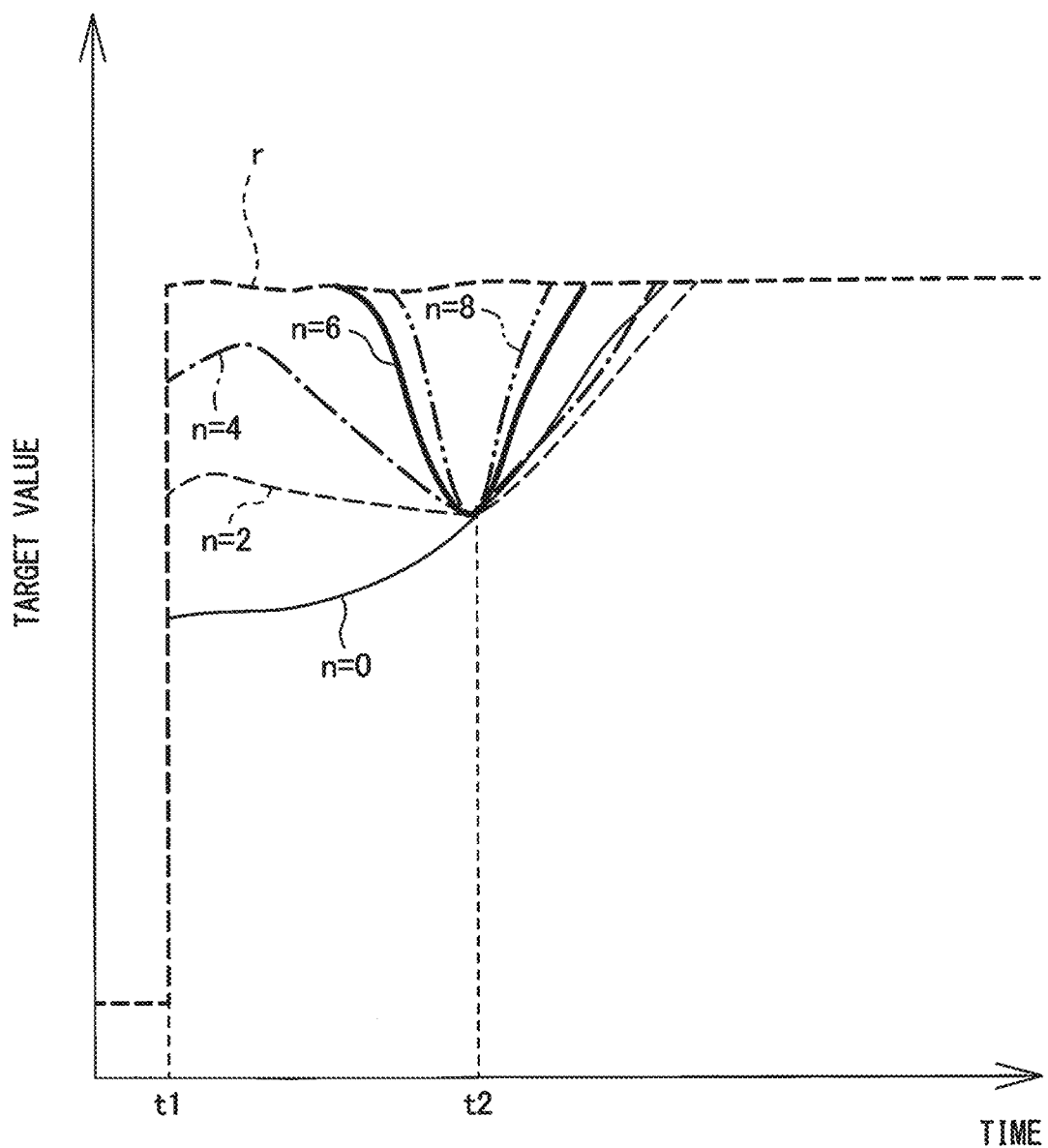
FIG. 6 is a time chart of the corrected target value when making the value of "n" in the target function change.

FIG. 6 is a time chart of a corrected target value when changing the value of "n" in the target function J(w). In FIG. 6, the target value "r" is shown by the broken line. Further, the corrected target value "w" when "n" is zero is shown by the solid line, the corrected target value "w" when "n" is 2 is shown by the broken line, the corrected target value "w" when "n" is 4 is shown by a one-dot chain line, the corrected target value "w" when "n" is 6 is shown by the solid line, and the corrected target value "w" when "n" is 8 is shown by the two-dot chain line. Note that, the corrected target value "w" when "n" is zero is shown as a comparative example.

In the example of FIG. 6, at the time t1, the state of the plant 6 changes and the target value "r" increases. The target value "r" is maintained at a substantially constant value after the time t1. If "n" is zero, as the control output "x" approaches the target value "r", the amount of correction of the target value "r" is gradually made smaller.

On the other hand, if "n" is 2 to 8, in the time period from the time t1 to the time t2, if the difference between the target value "r" and the current value of the control output "x" is relatively large, compared to when the difference between the target value "r" and the current value of the control output "x" is relatively small, the amount of correction of the target value "r" becomes smaller. This is because if the difference between the target value "r" and the current value of the control output "x" is relatively large, compared to if the difference between the target value "r" and the current value is relatively small, the target function is configured so that the degree of contribution of the term relating to the amount of correction of the target value to the value of the target function becomes larger. Further, from the time t2 on, the amount of correction of the target value "r" becomes gradually smaller along with the term relating to the degree of satisfaction of the limiting condition becoming smaller even without correction of the target value "r".

Figure 7:
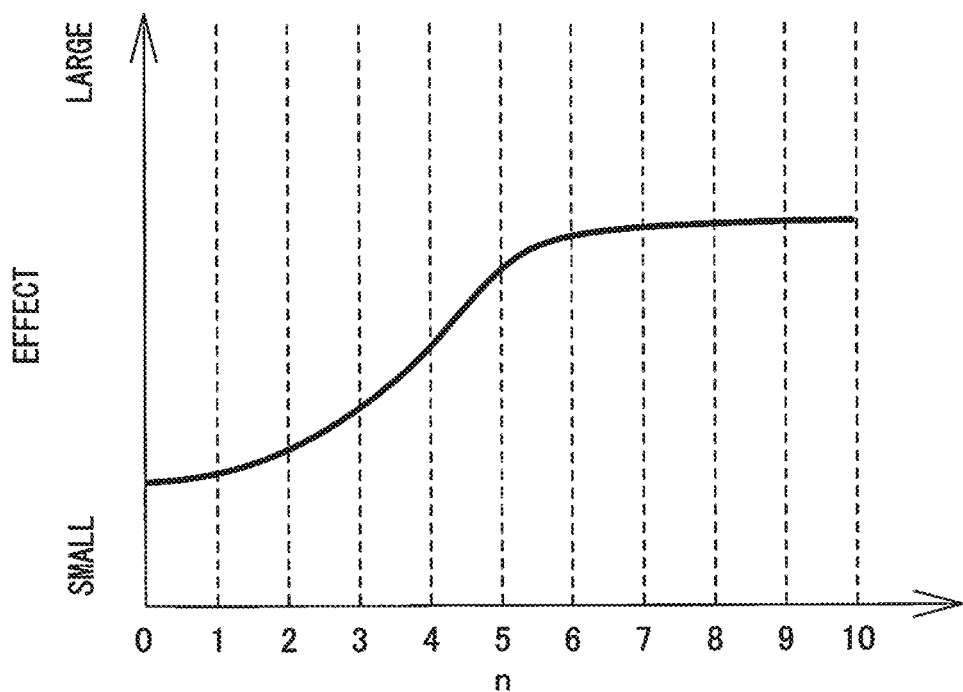
FIG. 7 is a view schematically showing an extent of effect when making the value of "n" in the target function change when the plant is an internal combustion engine.

If "n" is 2 to 8, the larger the number "n", the later the timing of increasing the amount of correction of the target value and the faster the speed of change of the corrected target value "w" when increasing the amount of correction of the target value. FIG. 7 is a view schematically showing the extent of the effect when changing the value of "n" in the target function J(w) if the plant is an internal combustion engine. The effect becomes larger the smaller the amount of overshoot of the control output "x" and becomes larger the more improved the response of the control output "x". That is, the effect becomes the highest if overshoot and response of the control output "x" are improved with the best balance.

As shown in FIG. 7, when "n" is equal to or more than 6, the effect becomes saturated, and even if increasing "n", the effect will not become much large. Further, the processing load of the reference governor 30 becomes larger the larger the "n". For this reason, if the plant 6 is an internal combustion engine, "n" is preferably set to a value of 4 to 6. Due to this, it is possible to reduce the processing load of the reference governor 30 while effectively improving the overshoot and response of the control output "x".

<Explanation of Control Using Time Chart>

Figure 8:
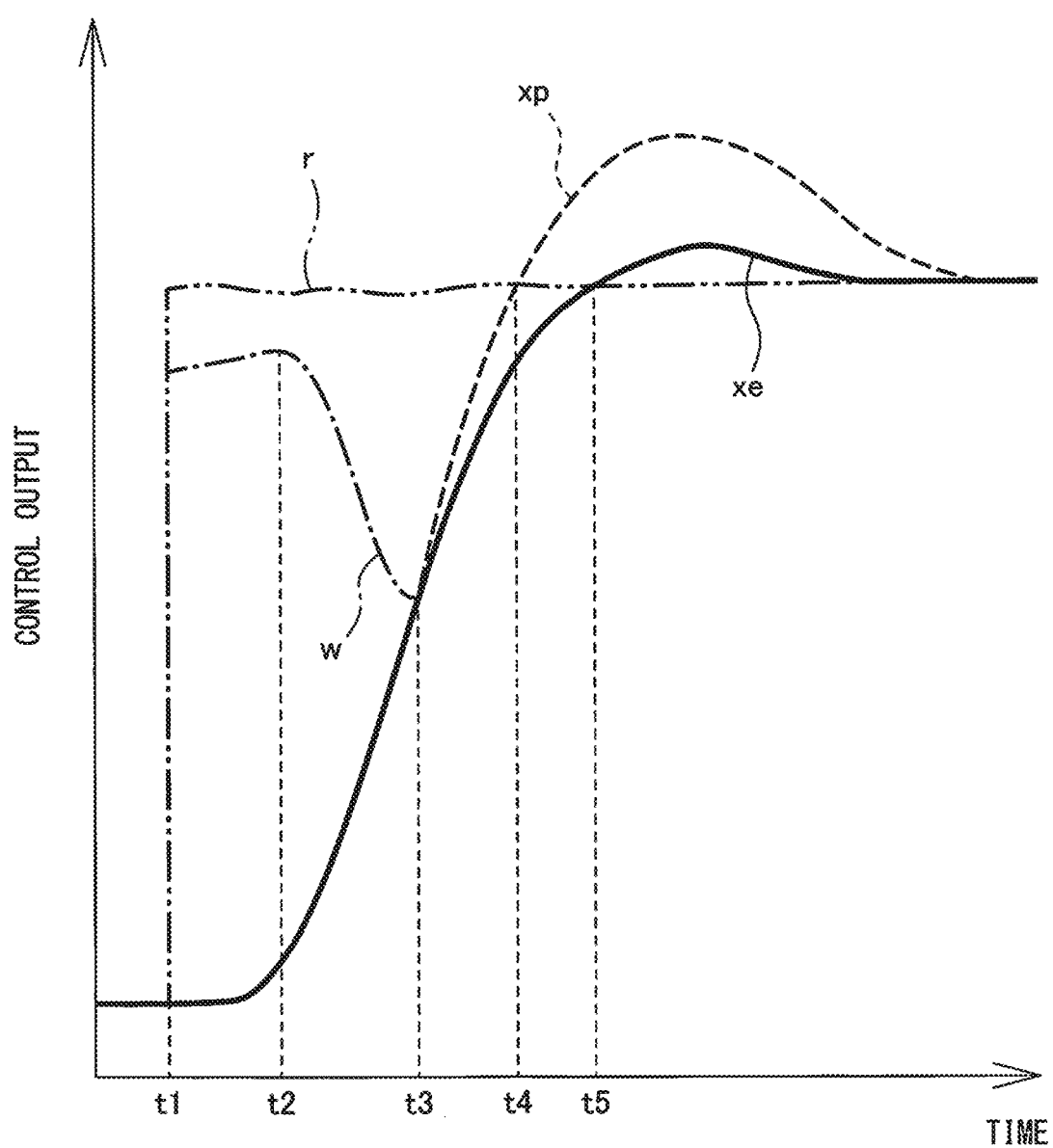
FIG. 8 is a time chart of a target value, corrected target value, and actual value of the control output in the case of making a control output change to the target value.

FIG. 8 is a time chart of the target value, the corrected target value, and the actual value of the control output in the case of making the control output change to the target value. In FIG. 8, the target value "r" of the control output "x" is shown by the two-dot chain line while the corrected target value "w" of the control output "x" is shown by the one-dot chain line. Further, the actual value (current value) xe of the control output "x" when the control of the present embodiment is performed is shown by the solid line, while the actual value (current value) xp of the control output "x" when the control of the comparative example is performed is shown by the broken line.

In the example of FIG. 8, the target function of the above formula (1) is used for calculating the corrected target value "w". "n" was set to 7. In the example of FIG. 8, at the time t1, the state of the internal combustion engine changes and the target value "r" increases. The target value "r" is maintained at a substantially constant value after the time t1. In this example, control is performed to make the control output "x" increase toward the target value "r".

In the control of the comparative example, the target value "r" is not corrected. Therefore, the control input "u" is determined by the feedback controller 5 so that the control output "x" approaches the target value "r". As a result, after the time t1, the actual value xp gradually rises and reaches the target value "r" at the time t4. After the time t4, overshoot of the control output "x" occurs, then the actual value xp converges to the target value "r".

On the other hand, in the control of the present embodiment, the corrected target value "w" is calculated by the reference governor 30 and the control input "u" is determined by the feedback controller 5 so that the control output "x" approaches the corrected target value "w". As a result of the corrected target value "w" being calculated so that the value of the target function becomes smaller, from the time t2 to the time t3, the corrected target value "w" is made gradually smaller and the amount of correction of the target value "r" is made gradually larger.

Further, from the time t3 to the time t5, the corrected target value "w" is gradually increased to the target value "r" and the amount of correction of the target value "r" is gradually decreased. After the time t5, the corrected target value "w" is maintained at the target value "r". The actual value xe gradually increases and reaches the target value "r" at the time t5. Note that, at the time t3 on, the actual value xe increases along the corrected target value "w". After the time t5, overshoot of the control output "x" slightly occurs, then the actual value xe converges to the target value "r".

In the control of the present embodiment, by making the corrected target value "w" gradually smaller from the time t2, it is possible to apply a brake to the rise of the control output "x". For this reason, compared to the control of the comparative example, it is possible to reduce the amount of overshoot of the control output "x". Further, the amount of correction of the target value "r" is small before the time t2, so in the same way as the control of the comparative example, the control output "x" can be made to quickly approach the target value "r". Therefore, in the control of the present embodiment, it is possible to suppress overshoot of the control output "x" while suppressing deterioration of response of the control output "x".

<Processing for Correction of Target Value>

FIG. 9 is a flow chart showing a control routine for processing for correction of a target value in the second embodiment. The present control routine is repeatedly performed at predetermined intervals by the plant control system.

First, at step S201, the target value calculating part 2 acquires the exogenous input "d". Next, at step S202, the target value calculating part 2 calculates the target value "r" based on the exogenous input "d".

Next, at step S203, the reference governor 30 sets the initial value wo of the corrected target value "w" to the target value "r". Next, at step S204 to step S206, the reference governor 30 performs a minimum value search of the target function.

Specifically, at step S204, the reference governor 30 updates the corrected target value "w" so that the value of the target function becomes smaller. For example, the reference governor 30 updates the corrected target value "w" by the binary search method. Note that, the corrected target value "w" may be updated by another known method. For example, if the number of control outputs "x" and corrected target values "w" are equal to or more than two, the reference governor 30 may update the corrected target value "w" by the gradient method.

Next, at step S205, the reference governor 30 adds 1 to the number of updates Count. The number of updates Count shows the number of times the corrected target value "w" is updated in the minimum value search. The initial value of the number of updates Count is "0".

Next, at step S206, the reference governor 30 judges whether the number of updates Count is equal to or more than a predetermined number N. The predetermined number Count is for example 5 to 200. If at step S206 it is judged that the number of updates Count is less than the predetermined number, the present control routine returns to step S204. Therefore, in the minimum value search, the corrected target value "w" is repeatedly updated until the number of updates Count reaches the predetermined number N.

If at step S206 it is judged that the number of updates Count is equal to or more than the predetermined number N, the present control routine proceeds to step S207. At step S207, the reference governor 30 inputs the final corrected target value "w" to the closed loop system 10. Next, at step S208, the reference governor 30 resets the number of updates Count to zero. After step S208, the present control routine ends.

<Other Embodiments>

Above, preferred embodiments according to the present invention were explained, but the present invention is not limited to these embodiments and can be corrected and changed in various ways within the language of the claims.

For example, in the second embodiment, the target function J(w) may be defined by the following formula (7):

$$J(w)=(r-w)^2+(S_1^2+S_2^2+\ldots)/(|r-PV|)^n \qquad (7)$$

Here, PV is the current value of the control output "r", while "n" is a value larger than zero. The target function J(w) is configured as the sum of the term relating to the amount of correction of the target value "r" (formula (1), right side, first term) and the term relating to the degree of satisfaction of the limiting conditions of the state quantities "y" (formula (1), right side, second term).

In this case, the term relating to the amount of correction of the target value "r" is a component which becomes larger the larger the amount of correction of the target value "r" and is a square of the amount of correction of the target value "r". Note that, this component may be a value obtained by multiplying the amount of correction of the target value "r" by a predetermined coefficient.

On the other hand, the term relating to the degree of satisfaction of the limiting conditions is the value obtained by dividing the component which becomes larger the lower the degree of satisfaction of the limiting conditions ($S_1^2+S_2^2+\ldots$) by the component which becomes larger the larger the difference between the target value "r" and the current value of the control output "x" ($(|r-PV|)^n$). In this case, if the difference between the target value "r" and the current value of the control output "x" is relatively large, compared to if the difference between the target value "r" and the current value of the control output "x" is relatively small, the degree of contribution of the term relating to the degree of satisfaction of the limiting conditions to the value of the target function J(w) becomes smaller. In other words, if the difference between the target value "r" and the current value of the control output "x" is relatively large, compared to when the difference between the target value "r" and current value of the control output "x" is relatively small, the degree of contribution of the term relating to the amount of correction of the target value "r" to the value of the target function J(w) becomes larger.

In the above formula (7), the component which becomes larger the lower the degree of satisfaction of the limiting conditions is the sum of the squares of the penalty functions. However, this component may be the sum of the penalty functions etc.

Further, in the above formula (7), the component which becomes larger the larger the difference between the target value "r" and the current value of the control output "x" is the "n" power of the difference between the target value "r" and the current value PV. However, this component may be a value obtained by multiplying the difference between the target value "r" and the current value PV by a predetermined coefficient.

Further, if the plant 6 is an internal combustion engine, the extent of the effect when changing the value of "n" in the above formula (7) is similar to the result such as shown in FIG. 7. For this reason, even when the target function of the above formula (7) is used so as to calculate the corrected target value "w", it is preferable to set "n" to a value of 4 to 6. By doing this, it is possible to reduce the processing load of the reference governor 30 while effectively improving the overshoot and response of the control output "x".

Further, the plant control system in the present embodiment can be applied to any type of plant enabling estimation of a future predicted value of the state quality of control output. For example, the plant 6 may be a diesel engine and the control output "x" may be the supercharging pressure. In this case, the exogenous input "d" is the engine speed and fuel injection amount, while the control input "u" is the degree of opening of a variable nozzle provided at the turbine of the turbocharger.

Further, the plant 6 may be a diesel engine and the control output "x" may be a supercharging pressure and EGR rate. In this case, the exogenous input "d" is the engine speed and fuel injection amount, while the control input "u" is the opening degree of the variable nozzle, opening degree of the throttle valve, and opening degree of EGR valve. Further, the plant may be an internal combustion engine other than a diesel engine such as a gasoline engine, a vehicle, machine tool, etc.

The invention claimed is:

1. A plant control system comprising:
   a target value calculating part configured to calculate a target value of a control output of a plant based on one or more of predetermined parameters of the plant;
   a target value correcting part configured to correct the target value in a direction suppressing overshoot of the control output so as to calculate a corrected target value; and
   a feedback controller configured to determine a control input of the plant so that the control output approaches the corrected target value,
   wherein the target value correcting part is configured to, when making the control output change to the target value,
      set the corrected target value so that an amount of correction of the target value becomes equal to or less than a predetermined value,
      then change the corrected target value so that the amount of correction of the target value becomes larger than the predetermined value, and
      then change the corrected target value so that the amount of correction of the target value becomes equal to or less than the predetermined value before the control output reaches the target value.

2. The plant control system according to claim 1, wherein the target value correcting part is configured to, when making the control output change to the target value,
   set the corrected target value so that the amount of correction of the target value becomes equal to or less than the predetermined value when a difference of the target value and a current value of the control output is larger than a first reference value,
   change the corrected target value so that the amount of correction of the target value becomes greater than the predetermined value when the difference reaches the first reference value, and
   change the corrected target value so that the amount of correction of the target value becomes equal to or less than the predetermined value when the difference reaches a second reference value, and wherein the second reference value is smaller than the first reference value.

3. The plant control system according to claim 1, wherein the target value correcting part is configured to perform a minimum value search of a target function to thereby calculate the corrected target value, and
   the target function includes a term relating to an amount of correction of the target value and a term relating to a degree of satisfaction of limiting conditions regarding a state quantity of the plant and is configured so that when a difference of the target value and a current value of the control output is relatively large, compared to when the difference is relatively small, a degree of contribution of the term relating to the amount of correction of the target value to a value of the target function becomes larger.

4. The plant control system according to claim 3, wherein the term relating to the amount of correction of the target value is a value obtained by multiplying a component which becomes larger the larger the amount of correction of the target value by a component which becomes larger the larger the difference.

5. The plant control system according to claim 3, wherein the term relating to the degree of satisfaction of the limiting conditions is a value obtained by dividing a component which becomes larger the lower the degree of satisfaction of the limiting conditions by a component which becomes larger the larger the difference.

6. The plant control system according to claim 4, wherein the component which becomes larger the larger the difference is an "n" power of the difference and "n" is larger than zero.

7. The plant control system according to claim 5, wherein the component which becomes larger the larger the difference is an "n" power of the difference and "n" is larger than zero.

8. The plant control system according to claim 6, wherein the plant is an internal combustion engine and "n" is a value of 4 to 6.

9. The plant control system according to claim 7, wherein the plant is an internal combustion engine and "n" is a value of 4 to 6.

\* \* \* \* \*